United States Patent [19]

Gorre, deceased et al.

[11] Patent Number: 5,246,687

[45] Date of Patent: Sep. 21, 1993

[54] SOLID-STATE PREPARATION OF HIGH PURITY BARIUM SULFATE

[75] Inventors: Luisa E. Gorre, deceased, late of Camarillo, Calif., by M. Efren Gorre, administrator; Ricardo C. Pastor, Manhattan Beach, Calif.

[73] Assignee: Hughes Aircraft Company, Los Angeles, Calif.

[21] Appl. No.: 11,849

[22] Filed: Jan. 29, 1993

Related U.S. Application Data

[63] Continuation of Ser. No. 678,088, Apr. 1, 1991, abandoned.

[51] Int. Cl.$^5$ .......................... C01F 5/42; C01F 11/46
[52] U.S. Cl. .................................. 423/554; 423/178; 106/461
[58] Field of Search ................... 423/555, 178, 554; 106/461; 149/61

[56] References Cited

U.S. PATENT DOCUMENTS

| | | | |
|---|---|---|---|
| 932,130 | 8/1909 | Hunter | 423/554 |
| 1,828,846 | 10/1931 | Pierce, Jr. | 423/554 |
| 3,957,675 | 5/1976 | Schutt | 106/461 |
| 4,066,736 | 1/1978 | Liggett | 423/557 |
| 4,272,296 | 6/1981 | Balducci et al. | 423/554 |

FOREIGN PATENT DOCUMENTS

| | | | |
|---|---|---|---|
| 2307254 | 8/1973 | Fed. Rep. of Germany | 423/554 |
| 2449649 | 9/1980 | France . | |
| 47-1008 | 1/1972 | Japan | 423/554 |
| 49-11728 | 3/1974 | Japan | 106/461 |
| 55-42233 | 3/1980 | Japan | 423/554 |
| 779298 | 11/1980 | U.S.S.R. | 423/554 |
| 2216510 | 10/1989 | United Kingdom . | |

Primary Examiner—Gary P. Straub
Attorney, Agent, or Firm—V. D. Duraiswamy; E. E. Leitereg; W. K. Denson-Low

[57] ABSTRACT

A novel, solid-state, low-temperature preparation of barium sulfate provides a higher purity material than that obtained by the conventional method of precipitation. The reaction involves heating a barium oxysalt in the presence of at least one sulfur-containing species for a period of time.

18 Claims, 2 Drawing Sheets

SOLID-STATE PREPARATION OF HIGH PURITY BARIUM SULFATE

This is a continuation of application Ser. No. 07/678,088, filed Apr. 1, 1991, now abandoned.

BACKGROUND OF THE INVENTION

1. Field of the Invention

The present invention is directed to the preparation of high purity barium sulfate, and, more particularly, to a novel, solid-state, low-temperature process for the preparation thereof.

2. Description of Related Art

Barium sulfate ($BaSO_4$) ceramic is a superlative optical reflector, and may soon become a viable component of optical circuits.

Precipitation is presently a favored method of preparation of $BaSO_4$ because of its low solubility: at 18° C., 100 g of water dissolves 0.002 g $BaSO_4$. A high-purity product is difficult to obtain by precipitation, however, because the $BaSO_4$ precipitate is a notorious carrier for dragging down dissolved impurities. These impurities serve as centers of, or sources for, radiation damage, a behavior that limits severely the application of the derived ceramic ware as an optical reflector for high-power applications.

As found in nature, the mineral (heavy spar) is not sufficiently pure. It should be colorless, but the presence of impurities impart a color. Again, the manufactured ceramic for IR-UV reflectors is prone to radiation damage (coloring) when the $BaSO_4$ is impure.

A method for the preparation of high purity barium sulfate is required.

SUMMARY OF THE INVENTION

In accordance with the invention, a solid-state preparation method is disclosed for the preparation of high purity barium sulfate. The solid-state preparation makes use of a barium oxysalt which can be decomposed to the oxide. The method comprises reacting a barium oxysalt with a sulfur-containing species at an elevated temperature under solid-state conditions. The method of the invention provides a higher purity product than obtained by prior art methods.

DESCRIPTION OF THE PREFERRED EMBODIMENTS

In the method of the invention, a barium oxysalt which can be decomposed to the oxide is employed. A preferred example is $Ba(NO_3)_2$ (barium nitrate), which can be obtained anhydrous and in high purity.

The barium oxysalt must be one that is thermally unstable. This is readily determined by evaluating the $\Delta G$ of the compound: the higher the $\Delta G$, the more unstable and hence the more suitable for use in the invention. For example, barium carbonate and barium phosphate will not work in the method of the invention, because they are very stable thermally.

In addition to barium nitrate, other barium oxysalts useful in the practice of the invention include barium perchlorate ($Ba(ClO_4)_2$), barium nitrite ($Ba(NO_2)_2$), barium thiosulfate ($BaS_2O_3$), barium oxalate, and barium salts of organic acids such as formic acid and acetic acid. Barium thiosulfate decomposes at 200° C. to form $BaSO_3$ and gaseous sulfur and is converted into $BaSO_4$ by one of two ways:

(a) by $(NH_4)_2SO_4$:

$BaSO_3 + (NH_4)_2SO_4 \rightarrow BaSO_4 + 2NH_3 \uparrow + H_2O \uparrow + SO_2 \uparrow$.

(b) by $NH_4NO_3$;

$BaSO_3 + NH_4NO_3 \rightarrow BaSO_4 + 2H_2O \uparrow + N_2 \uparrow$.

The weight ratio of $BaSO_4$, reactant needs to be established to effect 100% conversion, but this is not considered to constitute undue experimentation.

Figure 1:
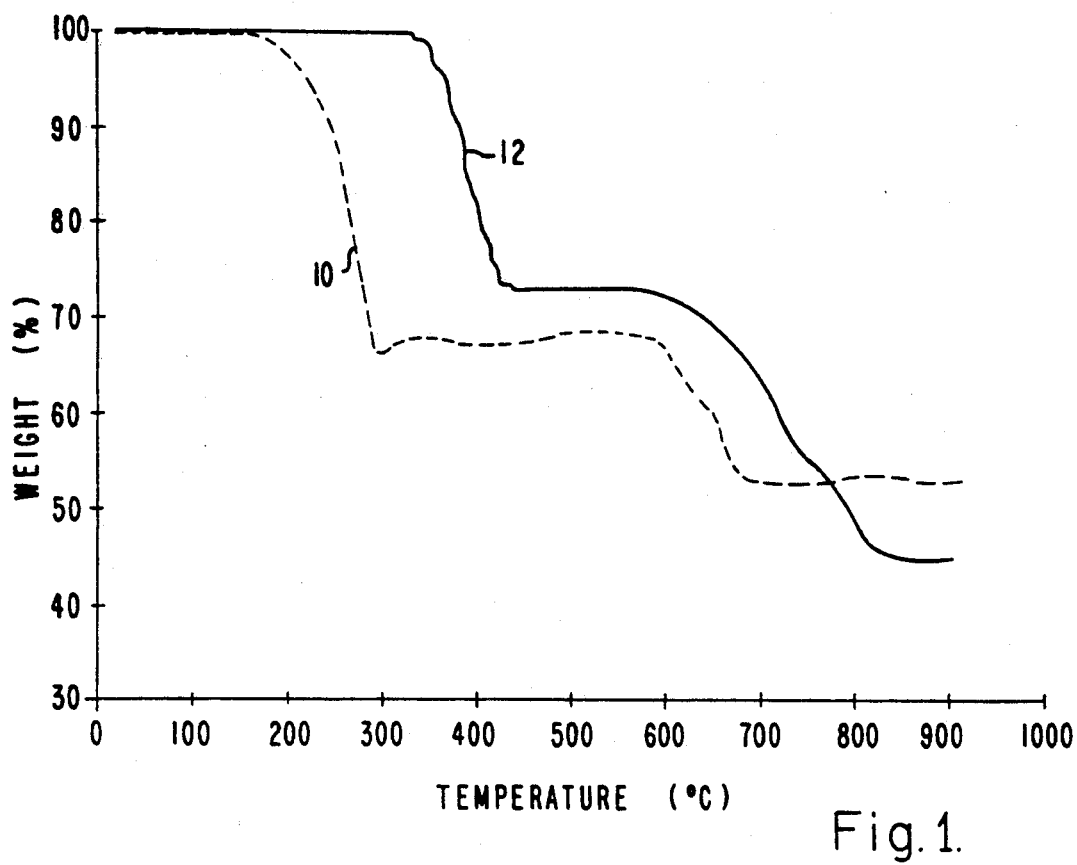
FIG. 1, on coordinates of weight (%) and temperature (°C.), is a TGA (thermogravimetric analysis) thermogram comparing the thermal breakdown of plain $Ba(NO_3)_2$ to its chemical breakdown in $Ba(NO_3)_2$:S = 1:5 molar ratio.

For solid-state conversion to $BaSO_4$, it is instructive to understand the thermal breakdown of $Ba(NO_3)_2$, as shown in FIG. 1 (Curve 10). The TGA thermogram pattern appears the same whether the breakdown is carried out under a flow of $N_2$ or $O_2$; hence, also for air. A two-stage thermal breakdown is noted, with the first onset at 325° C. and the second at 550° C. That is, two different temperatures are required to get rid of $N_2O_5$ completely.

$Ba(NO_3)_2$ can be reacted in the solid state with high purity sulfur (S) to produce $BaSO_4$:

The general reaction for the solid-state conversion of a barium oxysalt to barium sulfate is given by:

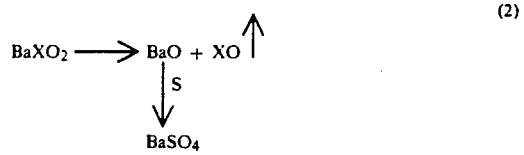

(2)

The free energy change for Reaction (1) is given by the expression,

Starting at room temperature, where $\Delta G° = -94$ kcal/mole, the forward drive of Eqn. (1) is favored with an increase in temperature, that is, at 1,000K, $\Delta G = -165$ kcal/mole. Unfortunately, the volatility of sulfur limits its role in the conversion. In FIG. 1, the curve of $Ba(NO_3)_2 + 5S$ (Curve 12) has an onset at 150° C., a value quite lower than 325° C. onset of the first-stage thermal breakdown. (Chemical breakdown should occur at a lower temperature than the thermal breakdown.) $BaSO_4$ formation is incomplete, halting at 300° C., due to the loss of reactant (sulfur) by volatilization. Thus, its second-stage breakdown has a similar onset temperature as the second-stage thermal breakdown of plain $Ba(NO_3)_2$. The residue (final plateau) differ in the two cases due to the presence of $BaSO_4$ in the case of $Ba(NO_3)_2:S = 1:5$ molar ratio. The product with sulfur is heavier.

The calcination of plain $Ba(NO_3)_2$ has for its end point BaO, while that of $Ba(NO_3)_2 5S$ is $BaSO_4$, or $BaO+SO_3$ (not achieved quantitatively), which is heavier. The position of the final plateau depends on the completeness of the conversion. It can be shown that for complete conversion, $Ba(NO_3)_2$ to BaO and $Ba(NO_3)_2+nS$ to $BaSO_4$, the final plateau should be the same for $n=4.25$, another argument against complete conversion with the use of sulfur. In addition, depending on the thermal scan rate, the exothermic reaction between molten sulfur and nitrate may become vigorous enough to lead to the spillage of material.

Figure 2:
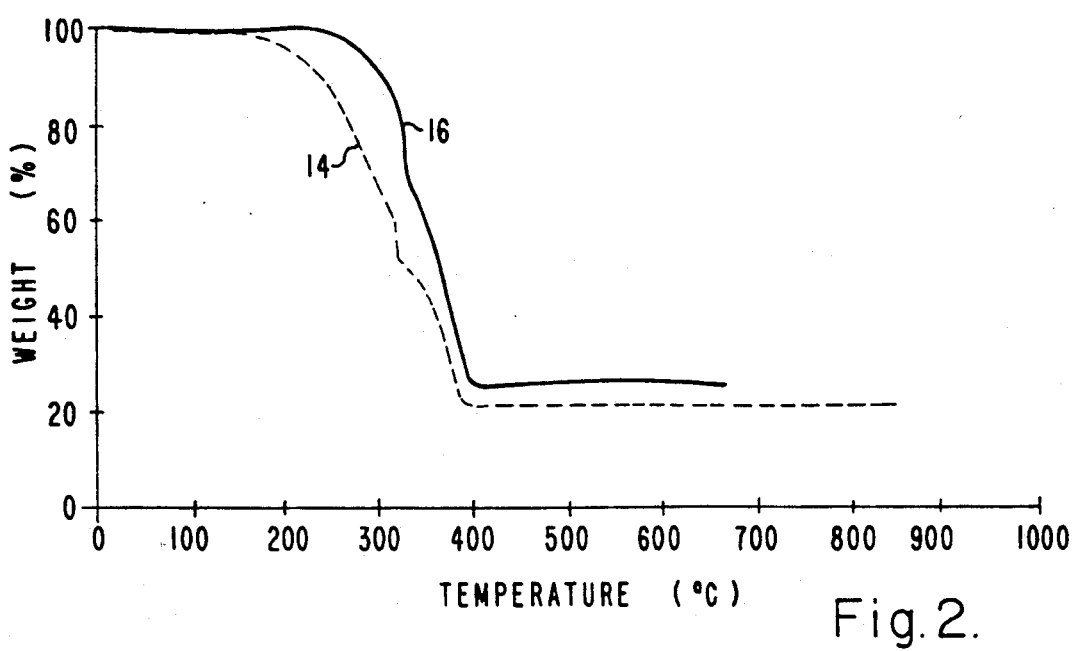
FIG. 2, on the same coordinates as FIG. 1, are TGA thermograms for the conversion of $Ba(NO_3)_2$ to $BaSO_4$, using two formulations: $Ba(NO_3)_2$:$(NH_4)_2SO_4$:S = 1:5:10 and 1:5:0.

FIG. 2 shows the TGA thermogram involving a third component, $Ba(NO_3)_2+10S+5(NH_4)_2SO_4$ (Curve 14). The onset temperature of about 150° C. is still the action of sulfur on the first-stage breakdown (cf. FIG. 1). Whereas the loss of sulfur terminates conversion at 300° C. (cf. FIG. 1), a vertical drop at 320° C. occurs in FIG. 2. The drop is independent of sulfur, as shown by $Ba(NO_3)_2+5(NH_4)_2SO_4$ occurring ring at 335° C. (Curve 16) and reflecting the difference in the nature of the matrices. It is seen with the latter curve that without the benefit of sulfur, the onset of breakdown is $>100°$ C. higher. Sulfur melts at 120° C. and the melt is very reactive to nitrate, be that $Ba(NO_3)_2$, $KNO_3$, etc. (Advantage is taken of this priming action in the formulation of matches and pyrotechnics.)

Thus, there are two different ways to perform the solid-state reaction, with and without sulfur. Using sulfur results in a lower thermal-onset process, as seen in FIG. 2 by the lower temperature of 75° C.

Correlating the onset of the nitrate-sulfate conversion to the breakdown of the ammonium salt, the onset at 250° C. is initiated by the presence of bisulfate ($NH_4HSO_4$). The bisulfate impurity is commonly found in the normal sulfate of the $NH_4$-salt. The most likely explanation is that $(NH_4)_2SO_4$ is the salt of a strong, stable acid ($H_2SO_4$) and a weak, volatile base ($NH_4OH \longleftrightarrow NH_3\uparrow + H_2O\uparrow$). Thus, it is readily hydrolyzed to some extent:

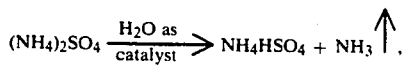

resulting in the breakdown of the sulfate and involving the loss of $NH_3$. These results are in agreement with the TGA thermogram of FIG. 3, which shows the thermal breakdown of reagent-grade $(NH_4)_2SO_4$ (Curve 18). However, conversion continues in FIG. 2 through the action of the third component (ammonium sulfate), with or without the benefit of sulfur. The calculated final plateau of 19 wt % for barium sulfate formation from $Ba(NO_3)_2 + 10S + 5(NH_4)_2SO_4$ agrees with the observed value of 20 wt % (cf. FIG. 2). The value of 19 wt % is the calculated value of the residue when completely converted to $BaSO_4$. It will be appreciated that ammonium bisulfate can also be used in place of $(NH_4)_2SO_4$ with or without the benefit of sulfur to convert quantitatively $Ba(NO_3)_2$ to $BaSO_4$.

The reaction of FIG. 2 (without free sulfur) is

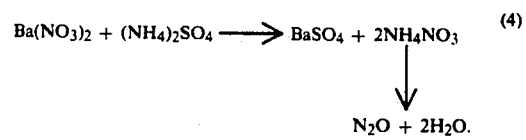

Reaction (1) is not followed quantitatively; hence, the amount of sulfur is considerably in excess of stoichiometry. As in pyrotechnics, some sulfur is lost as $SO_2$:

Reaction (4) is the part of interest to show the conversion to $BaSO_4$. However, there are side reactions occurring, e.g., the thermal breakdown of $(NH_4)SO_4$:

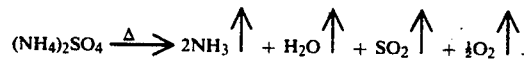

Figure 3:
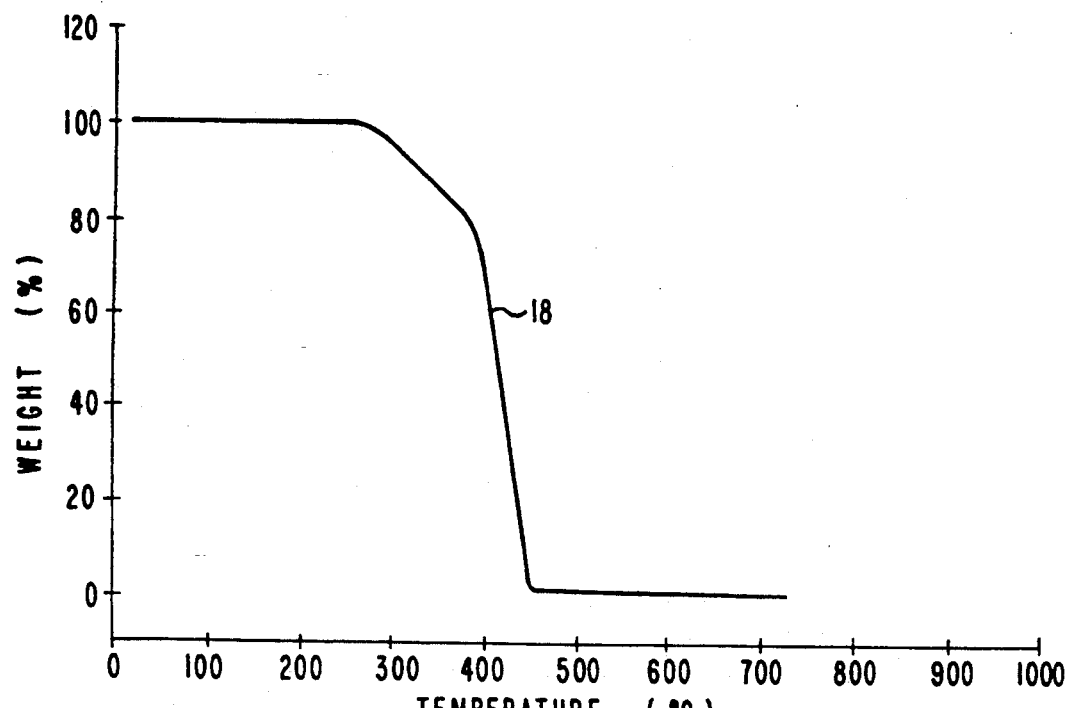
FIG. 3, on the same coordinates as FIG. 1, are TGA thermogram showing the breakdown of $(NH_4)_2SO_4$.

From FIG. 3, it is seen that $(NH_4)_2SO_4$ breaks down at 300° C. and attacks $Ba(NO_3)_2$. It will be recalled from FIG. 1 that $Ba(NO_3)$, alone breaks down at $>350°$ C.

Figure 4:
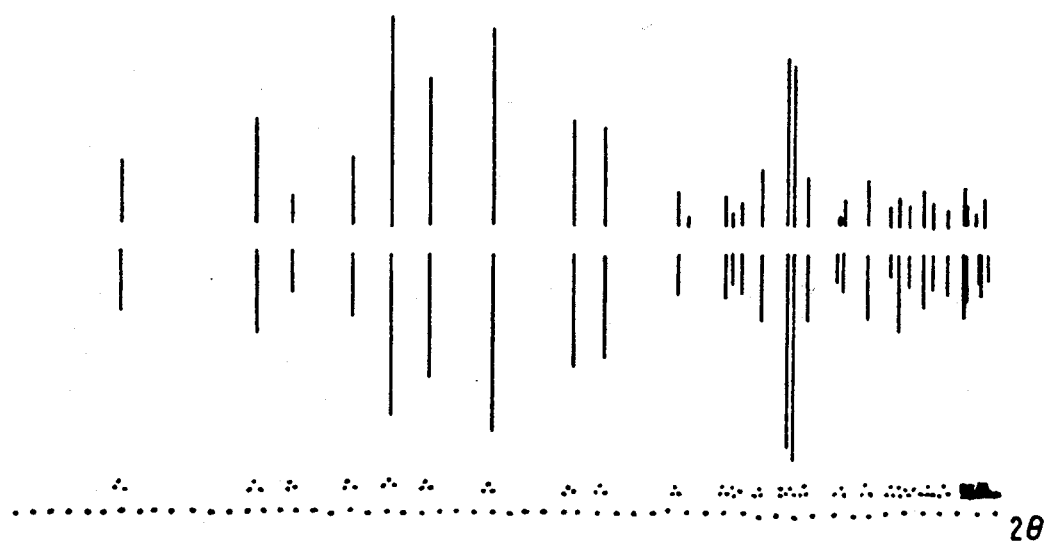
FIG. 4, on coordinates of intensity and $2\Theta$, is a comparison of the X-ray diffraction pattern of $BaSO_4$ prepared by the solid-state reaction of the invention and the $BaSO_4$ standard; the latter corresponds to the series of diffraction lines below.

FIG. 4 shows the good match-up between the X-ray powder diffractogram pattern of the product of the solid-state reaction with a known standard of $BaSO_4$ (File #24–1035).

The concentration range for the sulfur-containing species should be in excess relative to the barium oxysalt, due to the fact that solid-state reactions do not provide the intimate contact of liquid solutions. Hence, if a reactant has an intrinsic thermal breakdown, as in the case of $(NH_4)_2SO_4$, that process will compete with the conversion process in the utilization of that reactant. The preferred ratio of barium oxysalt to sulfur-containing species is somewhat arbitrary, with the lower bound being close to 1:5, but actually considerably influenced by the temperature-time profile.

As used herein, the term "sulfur-containing species" is intended to include both sulfur-containing compounds, as well as free sulfur. The sulfur-containing compounds are preferably $NH_4$-salts to avoid contaminating the residue ($BaSO_4$). Examples of such compounds include ammonium sulfate, ammonium bisulfate, and ammonium pyrosulfate ($(NH_4)_2S_2O_7$).

Since free sulfur sublimes, it is possible to collect it downstream from the reaction and recycle it.

In operation, the reaction with sulfur only is carried out at a first temperature, ranging from about 150° to 350° C., and then at a second temperature, ranging from about 600° C. to 700° C., based on FIG. 1. Programmed heating may be used, for example, for about 30 to 60 min at about 200° to 250° C., followed by a ramp-up and about 30 to 60 min at about 600° to 700° C.

In an alternative process, using a sulfur-containing compound, the reaction is carried out at a first temperature, ranging from about 150° to 350° C., and then at a second temperature, ranging from about 450° to 550° C., based on FIG. 1. Free sulfur is optionally employed, as described above. Programmed heating may be used, for example, for about 30 to 60 min at about 200° to 250° C., followed by a ramp-up and about 30 to 60 min at about 400° to 550° C. One could instead carry out the process in one stage by selecting one temperature range, 400° to 450° C., for example, but sulfur would be volatilized, and a higher ratio of sulfur would have to be used to compensate. On the other hand, excess sulfur could be collected downstream and recycled, as discussed above.

The temperatures indicated in the case of the sulfur-containing compound are based on the conversion of $Ba(NO_3)_2$ with $(NH_4)_2SO_4$ and with $(NH_4)_2SO_4+nS$. The low-temperature range may shift lower with the more unstable Ba-salts, such as Ba-formate, $(HCO_2)_2Ba$, in place of $Ba(NO_3)_2$. Where the Ba-salt is more thermally stable, such as $Ba(NO_3)_2$, onset of the low-temperature range is determined by the breakdown of the other reactant, increasing from $NH_4HSO_4$ to $(NH_4)_2SO_4$ to $(NH_4)_2S_2O_7$.

The times indicated above at a given temperature are based on relatively small quantities of reactants, about 0.01 mole. For considerably larger quantities of reactants, the times could be significantly longer. Routine experimentation would determine such longer times as a function of quantity of reactants.

Many factors bear on the optimization of $Ba(NO_3)_2$ to $BaSO_4$, notable of which are: (a) whether or not sulfur is employed with $(NH_4)_2SO_4$ and (b) the temperature-time residence profile. Also, the choice of (a) will be affected by a change in scale, say from 0.01 mole to 1.0 mole, as indicated above.

As used herein, the term "high purity" of barium sulfate is intended to refer to a material having a maximum total of 5 ppm impurities, especially with respect to heavy metals. Electronic-grade starting material is preferably used in the process of the invention. Thus, the final impurity level is determined by pick-up during processing. Consequently, Pt-liners on ceramics (silica, alumina, mullite, etc.) are desirably employed.

EXAMPLES

Example 1

In this Example, barium nitrate was reacted with ammonium sulfate in a ratio of 1:5, based on 0.01 mole. An intimate mixture of 2.61 g $Ba(NO_3)_2$ and 6.61 g $(NH_4)_2SO_4$ was prepared by grinding and mixing the two powders in a mortar and pestle. The mix was then slurried in a vehicle of methanol, which was easily evaporated to yield the intimate mixture.

The mixture was heated to 275° C. and held there for 30 min, then to 340° C. and held there for 30 min, and finally to about 450° to 500° C. and held there for 1 hour.

The resulting conversion to barium sulfate was 100%; the weight of the residue (after the reaction) compared to the initial weight of the reactants (mixture) was 24% (predicted: 25%). The X-ray diffraction pattern matched that of standard $BaSO_4$.

Example 2

In this Example, barium nitrate was reacted with ammonium sulfate and sulfur in a ratio of 1:5:10, based on 0.01 mole. An intimate mixture of 2.61 g $Ba(NO_3)_2$, 6.61 g $(NH_4)_2SO_4$, and 1.60 g S was prepared as in Example 1.

The mixture was heated to 200° C. and held there for 45 min, then to 340° C. and held there for 30 min, and finally to about 450° to 500° C. and held there for 1 hour.

The resulting conversion to barium sulfate was 100%; the weight of the residue (after the reaction) compared to the initial weight of the reactants (mixture) was 20% (predicted: 19%). The X-ray diffraction pattern matched that of standard $BaSO_4$.

Thus, there has been disclosed a method for the solid-state preparation of high purity barium sulfate. It will be apparent to those skilled in the art that various changes and modifications of an obvious nature may be made, and all such changes and modifications are considered to fall within the scope of the invention, as defined by the appended claims.

What is claimed is:

1. A method of preparing high purity barium sulfate having a maximum total of 5 ppm impurities comprising:
    reacting a barium compound selected from the group consisting of barium nitrate, barium perchlorate, barium nitrite, barium thiosulfate, and barium salts of formic and acetic acid with a sulfur-containing species selected from the group consisting of ammonium sulfate, ammonium bisulfate and ammonium pyrosulfate compounds, free sulfur and mixtures thereof at an elevated temperature of at least about 150° C. under solid state conditions, with the proviso that where said barium compound is a barium salt of formic and acetic acid, then said sulfur-containing species is selected from the group consisting of ammonium sulfate, ammonium bisulfate and ammonium pyrosulfate compounds.

2. The method of claim 1 wherein said barium compound consists essentially of barium nitrate.

3. The method of claim 1 wherein said sulfur-containing species is present in an excess relative to said barium compound.

4. The method of claim 3 wherein said sulfur-containing species is present in a molar ratio of at least about 5:1 relative to said barium compound.

5. The method of claim 1 wherein said sulfur-containing species comprises both sulfur and an ammonium sulfate salt.

6. The method of claim 1 wherein during the step of reacting, said barium compound and said sulfur-containing species are heated to a first temperature for a first period of time and sequentially to a second temperature, which is higher than said first temperature, for a second period of time, the total of both said periods of time being sufficient to effect formation of said barium sulfate.

7. The method of claim 1 wherein said solid-state reaction is carried out at a first temperature ranging from about 150° to 350° C. for a first period of time and then at a second temperature ranging from about 600° to 700° C. for a second period of time in the presence of free sulfur.

8. The method of claim 7 wherein said first temperature ranges from about 200° to 250° C.

9. The method of claim 1 wherein said solid-state reaction is carried out at a first temperature ranging from about 150° to 350° C. for a first period of time and then at a second temperature ranging from about 400° to 550° for a second period of time in the presence of at least one sulfur-containing species which includes a sulfur-containing compound selected from the group consisting of ammonium sulfate, ammonium bisulfate and ammonium pyrosulfate compounds.

10. The method of claim 1 wherein said solid-state reaction is carried out at a temperature ranging from about 400° to 450° C. for a period of time sufficient to effect formation of said barium sulfate in the presence of at least one sulfur-containing species which includes a sulfur-containing compound selected from the group consisting of ammonium sulfate, ammonium bisulfate and ammonium pyrosulfate compounds.

11. A method of preparing high purity barium sulfate having a maximum total of 5 ppm impurities comprising reacting a barium nitrate with a sulfur-containing species comprising at least one member selected from the group consisting of free sulfur and ammonium sulfate and ammonium bisulfate compounds, said sulfur-containing species being present in an excess relative to said barium nitrate, said reaction being carried out at an elevated temperature of at least about 150° C. under solid state conditions.

12. The method of claim 11 wherein said sulfur-containing species is present in a molar ratio of at least about 5:1 relative to said barium nitrate.

13. The method of claim 11 wherein said sulfur-containing species comprises both sulfur free and an ammonium sulfate salt.

14. The method of claim 11 wherein during the step of reacting, said barium nitrate and said sulfur-containing species are heated to a first temperature for a first period of time and sequentially to a second temperature, which is higher than said first temperature, for a second period of time, the total of both said periods of time being sufficient to effect formation of said barium sulfate.

15. The method of claim 11 wherein said solid-state reaction is carried out at a first temperature ranging from about 150° to 350° C. for a period of time and then at a second temperature ranging from about 600° to 700° C. for a period of time in the presence of free sulfur.

16. The method of claim 15 wherein said first temperature ranges from about 200° to 250° C.

17. The method of claim 11 wherein said solid-state reaction is carried out at a first temperature ranging from about 150° to 350° C. for a period of time and then at a second temperature ranging from about 400° to 550° C. for a period of time in the presence of at least one sulfur-containing species which includes a sulfur-containing compound selected from the group consisting of ammonium sulfate, ammonium bisulfate and ammonium pyrosulfate compounds.

18. The method of claim 11 wherein said solid-state reaction is carried out at a temperature ranging from about 400° to 450° C. for about 30 to 60 min in the presence of at least one sulfur-containing species which includes a sulfur-containing compound selected from the group consisting of ammonium sulfate, ammonium bisulfate and ammonium pyrosulfate compounds.

* * * * *